US010194220B2

(12) United States Patent
Korva et al.

(10) Patent No.: US 10,194,220 B2
(45) Date of Patent: Jan. 29, 2019

(54) ANTENNA APPARATUS THAT UTILIZES A UTILITY LINE AND METHODS OF MANUFACTURING AND USE

(71) Applicant: PULSE FINLAND OY, Oulunsalo (FI)

(72) Inventors: Heikki Korva, Tupos (FI); Kimmo Koskiniemi, Oulu (FI)

(73) Assignee: Pulse Finland OY, Oulunsalo (FI)

( * ) Notice: Subject to any disclaimer, the term of this patent is extended or adjusted under 35 U.S.C. 154(b) by 0 days.

(21) Appl. No.: 15/399,628

(22) Filed: Jan. 5, 2017

(65) Prior Publication Data
US 2018/0192166 A1  Jul. 5, 2018

(51) Int. Cl.
| | |
|---|---|
| G01D 4/02 | (2006.01) |
| H01Q 1/22 | (2006.01) |
| H01Q 1/36 | (2006.01) |
| H01Q 1/38 | (2006.01) |
| H01Q 7/00 | (2006.01) |
| H04Q 9/00 | (2006.01) |

(52) U.S. Cl.
CPC ............... *H04Q 9/00* (2013.01); *G01D 4/02* (2013.01); *H01Q 1/2233* (2013.01); *H01Q 1/2291* (2013.01); *H01Q 1/362* (2013.01); *H01Q 1/38* (2013.01); *H01Q 7/00* (2013.01); *H04Q 2209/60* (2013.01)

(58) Field of Classification Search
CPC .......... H04Q 2209/10; H04Q 2209/40; H04Q 2209/50; H04Q 2209/60; H04Q 2209/75; H01Q 1/2233; H01Q 11/08; H04B 1/18
See application file for complete search history.

(56) References Cited

U.S. PATENT DOCUMENTS

| | | | | |
|---|---|---|---|---|
| 6,806,836 B2* | 10/2004 | Ogawa | ............. | H01Q 1/242 343/702 |
| 7,501,983 B2* | 3/2009 | Mikkola | ............. | H01Q 1/243 343/700 MS |
| 7,525,508 B2* | 4/2009 | Sharaiha | ............. | H01Q 1/362 343/700 MS |
| 8,931,337 B2* | 1/2015 | Renoud | ............. | G01F 15/063 73/198 |

(Continued)

FOREIGN PATENT DOCUMENTS

| | | |
|---|---|---|
| EP | 2579007 A1 | 4/2013 |
| WO | WO 2017167367 A1 * 10/2017 | ............. G01D 4/002 |

*Primary Examiner* — Hai Phan
*Assistant Examiner* — Franklin D Balseca
(74) *Attorney, Agent, or Firm* — Gazdzinski & Associates, PC (57) ABSTRACT

Antenna apparatus that utilizes a utility line in order to improve performance of the antenna apparatus. In one embodiment, a smart meter that utilizes the aforementioned antenna apparatus is disclosed. The smart meter includes a utility meter housing configured to house a smart metering module, the utility meter housing enclosing: a wireless reporting portion comprising a helical coil radiator, the helical coil radiator being coupled to an RF transmission path, the RF transmission path configured to couple the helical coil radiator to an RF transceiver integrated circuit; an enclosure configured to house the RF transceiver integrated circuit, the enclosure further comprising a distribution portion comprising one or more meter sensing electronics; and a utility line port, the utility line port configured to position a utility line adjacent and parallel with the helical coil radiator.

13 Claims, 5 Drawing Sheets

(56) References Cited

U.S. PATENT DOCUMENTS

| | | |
|---|---|---|
| 9,325,060 B2 | 4/2016 | Kalistaja et al. |
| 2009/0167547 A1* | 7/2009 | Gilbert .................... G01D 4/02 340/662 |
| 2013/0229314 A1 | 9/2013 | Kuehler et al. |
| 2015/0375246 A1 | 12/2015 | Kalistaja et al. |

* cited by examiner

ANTENNA APPARATUS THAT UTILIZES A UTILITY LINE AND METHODS OF MANUFACTURING AND USE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNOLOGICAL FIELD

The present disclosure relates generally to antenna solutions and more particularly in one exemplary aspect to antenna solutions for use in smart metering solutions including, without limitation, gas, electricity and water metering solutions.

2. DESCRIPTION OF RELATED TECHNOLOGY

With the development of market-driven pricing throughout the world, energy providers (e.g., utility companies) have long sought a means to match energy consumption with energy generation and delivery. This problem has been exacerbated with electricity deregulation throughout various ones of these markets. Traditional metering technologies have only provided the ability to measure total consumption of energy (e.g., water, electricity, gas, etc.), and hence have not provided reliable information as to when the energy was consumed at each metered site. Additionally, these prior metering technologies often required an inspector to be physically present at the site of the meter in order to provide for a reading, which resulted in operational inefficiencies due to the time consuming nature of physically inspecting each of these metered sites as well as errors resultant from, inter alia, inaccurate reporting of these read meters.

With the introduction of so-called smart metering technologies many of these known deficiencies have been resolved and/or minimized. Smart metering technology utilizes electronic devices that record, store and transmit data associated with end customer energy usage. The successful implementation of these smart metering devices results in the timely and accurate delivery of this telemetry data. By providing this telemetry data remotely, energy providers can provide for an accurate accounting of calculated energy usage, while improving upon operational costs and operational efficiencies resulting in, inter alia, lower energy costs for their end users/consumers. Additionally, this provided telemetry data provides energy providers with a means by which to monitor and quickly diagnose various parameters associated with their energy consumption and delivery supply chains.

One such smart metering technological solution utilizes the 169 MHz frequency band for the transmission of its telemetry data. This particular frequency band is beneficial in that it is located in an industrial, scientific and medical (ISM) radio band. Additionally, this particular frequency band has a relatively long radio range (up to about five kilometers in an open field) while also providing for a simplified network configuration as well as simplified installation and maintenance. However, constructing antenna structures for operation in this 169 MHz frequency band has introduced its own difficulties. For example, the wavelength of a radio frequency (RF) signal of 169 MHz in free space is approximately 1.775 meters. Accordingly, a half wave antenna structure would need to be on the order of about 0.89 meters in size. Unfortunately, typical metering boxes are on the order of about 0.2 meters by 0.3 meters by 0.15 (width/length/height) in size, which makes physically incorporating an antenna structure of this size onto these metering boxes difficult.

Prior art attempts at addressing these deficiencies has resulted in the use of dielectric materials (e.g., ceramic) in order to reduce the physical size of the antenna component. Moreover, the use of helical coils has been utilized in order to accommodate the relatively long electrical length required for these antennas by incorporating these relatively long structures into a relatively small space. Finally, large planar inverted-F antennas with a direct or coupled feed have also been utilized in order to address the size limitations associated with operation in these frequency bands. However, all of these prior techniques have resulted in antenna structures that suffer from one or more deficiencies including reduced bandwidth, reduced radiation efficiency and/or limited gain when they are integrated into a typical meter mechanical enclosure that is comparatively small as compared with the operating frequency/wavelength. Accordingly, what is needed are improved antenna solutions that address these aforementioned identified prior art deficiencies.

SUMMARY

The aforementioned needs are satisfied herein by providing antenna apparatus, systems and methods that provides for, inter alia, wider operating bandwidth, improved radiation efficiency over prior art solutions, and improved gain.

In a first aspect, a smart metering module is disclosed. In one embodiment, the smart metering module includes a wireless reporting portion that includes a helical coil radiator, the helical coil radiator being coupled to an RF transmission path, the RF transmission path configured to couple the helical coil radiator to an RF transceiver integrated circuit; an enclosure configured to house the RF transceiver integrated circuit, the enclosure further comprising a distribution portion comprising one or more meter sensing electronics, the distribution portion configured to be galvanically separated from the wireless reporting portion; and a utility line port, the utility line port configured to position a utility line adjacent and parallel with a longitudinal axis of the helical coil radiator.

In one variant, the operating frequency for the wireless reporting portion is equal to a value $\lambda$, where a size of the wireless reporting portion fits within a sphere having a radius 'r' that is less than or equal to $\lambda/2\pi$.

In another variant, the utility line port is configured to position the utility line a distance that is less than or equal to $0.62*\text{sqrt}(r^3/\lambda)$.

In yet another variant, the utility line port is configured to position the utility line a distance that is less than or equal to $0.62*\text{sqrt}(r^3/\lambda)$, where 'r' is the radius of a sphere in which the wireless portion fits and where the operating frequency for the wireless reporting portion is equal to the value $\lambda$.

In yet another variant, a length of the helical coil radiator is equal to approximately $0.5\lambda$.

In yet another variant, the helical coil radiator comprises a conductive layer that is printed onto a dielectric substrate.

In a second aspect, a smart meter having the aforementioned smart metering module is disclosed. In one embodiment, the smart meter includes a utility meter housing configured to house a smart metering module, the utility meter housing enclosing: a wireless reporting portion comprising a helical coil radiator, the helical coil radiator being coupled to an RF transmission path, the RF transmission path configured to couple the helical coil radiator to an RF transceiver integrated circuit; an enclosure configured to house the RF transceiver integrated circuit, the enclosure further comprising a distribution portion comprising one or more meter sensing electronics, the distribution portion configured to be galvanically separated from the wireless reporting portion; and a utility line port, the utility line port configured to position a utility line adjacent and parallel with the helical coil radiator; and a utility line, at least a portion of the utility line configured to be disposed within the utility meter housing at the utility line port.

In one variant, the operating frequency for the wireless reporting portion is equal to a value $\lambda$, where a size of the wireless reporting portion fits within a sphere having a radius 'r' that is less than or equal to $\lambda/2\pi$.

In another variant, the utility line port is configured to position the utility line a distance that is less than or equal to $0.62*\text{sqrt}(r^3/\lambda)$.

In yet another variant, the utility line port is configured to position the utility line a distance that is less than or equal to $0.62*\text{sqrt}(r^3/\lambda)$, where 'r' is the radius of a sphere in which the wireless reporting portion fits and where the operating frequency for the wireless reporting portion is equal to the value $\lambda$.

In yet another variant, the utility line is selected from the group consisting of a power line, a gas line, and a water or sewage line.

In yet another variant, the utility line port is configured to position the utility line a distance that is less than or equal to $0.62*\text{sqrt}(r^3/\lambda)$, where 'r' is the radius of a sphere in which the wireless reporting portion fits and where the operating frequency for the wireless reporting portion is equal to the value $\lambda$.

In yet another variant, a length of the utility line that runs parallel with the helical coil radiator is at least $0.5\lambda$, where $\lambda$ is an operating frequency for the wireless reporting portion.

In a third aspect, an antenna subassembly for use with, for example, the aforementioned smart metering module is disclosed. In one embodiment, the antenna subassembly includes a helical coil radiator that is galvanically joined with a support printed circuit board (PCB); a radio frequency (RF) transceiver integrated circuit that is coupled with the helical coil radiator; and the antenna subassembly is configured to operate at an operational frequency value '$\lambda$'.

In one variant, a total height for the helical coil radiator is equal to approximately $0.05\lambda$.

In another variant, a total length for the helical coil radiator is equal to approximately $0.5\lambda$.

In yet another variant, the antenna subassembly fits within a sphere having a radius 'r', the radius 'r' of the sphere being less than $\lambda/2\pi$.

In yet another variant, the antenna subassembly further includes an enclosure having a utility line port, the utility line port configured to position a utility line adjacent and parallel with a longitudinal axis of the helical coil radiator.

In yet another variant, the utility line port is configured to position the utility line a distance that is less than or equal to $0.62*\text{sqrt}(r^3/\lambda)$, where 'r' is the radius of a sphere in which the antenna subassembly fits.

In yet another variant, a length of the helical coil radiator is equal to approximately $0.5\lambda$.

In a fourth aspect, a method of manufacturing the aforementioned smart metering module is disclosed. In one embodiment, the method includes assembling a wireless reporting portion that includes a helical coil radiator, the helical coil radiator being coupled to an RF transmission path, the RF transmission path configured to couple the helical coil radiator to an RF transceiver integrated circuit; acquiring an enclosure configured to house the RF transceiver integrated circuit, the enclosure further comprising a distribution portion comprising one or more meter sensing electronics, the distribution portion configured to be galvanically separated from the wireless reporting portion; and forming a utility line port, the utility line port configured to position a utility line adjacent and parallel with a longitudinal axis of the helical coil radiator.

In a fifth aspect, a method of manufacturing the aforementioned smart meter is disclosed. In one embodiment, the method includes acquiring a utility meter housing configured to house a smart metering module, the utility meter housing enclosing: a wireless reporting portion comprising a helical coil radiator, the helical coil radiator being coupled to an RF transmission path, the RF transmission path configured to couple the helical coil radiator to an RF transceiver integrated circuit; an enclosure configured to house the RF transceiver integrated circuit, the enclosure further comprising a distribution portion comprising one or more meter sensing electronics, the distribution portion configured to be galvanically separated from the wireless reporting portion; and a utility line port, the utility line port configured to position a utility line adjacent and parallel with the helical coil radiator; and installing a utility line into the utility line port.

In a sixth aspect, a method of manufacturing the aforementioned antenna subassembly is disclosed. In one embodiment, the method includes forming a helical coil radiator; galvanically joining the helical coil radiator with a support printed circuit board (PCB); soldering a radio frequency (RF) transceiver integrated circuit so that the RF transceiver integrated circuit is coupled with the helical coil radiator; and testing the antenna subassembly at an operational frequency value '$\lambda$'.

In a seventh aspect, a method of using the aforementioned smart metering module is disclosed. In one embodiment, the method includes acquiring a smart metering module having a utility line port; installing a utility line into the utility line port; and operating the smart metering module.

Various objects, features, aspects and advantages of the inventive subject matter will become more apparent from the following detailed description of exemplary embodiments, along with the accompanying drawings.

BRIEF DESCRIPTION OF THE DRAWINGS

The features, objectives, and advantages of the disclosure will become more apparent from the detailed description set forth below when taken in conjunction with the drawings, wherein.

DETAILED DESCRIPTION

Reference is now made to the drawings wherein like numerals refer to like parts throughout.

As used herein, the term "antenna" refers without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from location to another location, using, or more repeater links, and one or more locations may be mobile, stationary, or fixed to a location on earth such as a base station.

As used herein, the term "substrate" refers generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

Furthermore, as used herein, the terms "radiator," and "radiating element" refer without limitation to an element that can function as part of a system that receives and/or transmits radio-frequency electromagnetic radiation; e.g., an antenna. Hence, an exemplary radiator may receive electromagnetic radiation; transmit electromagnetic radiation, or both.

The term "feed" refers without limitation to any energy conductor and coupling element(s) that can transfer energy, transform impedance, enhance performance characteristics, and conform impedance properties between an incoming/outgoing RF energy signals to that of one or more connective elements, such as for example a radiator.

As used herein, the terms "integrated circuit", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "top", "bottom", "side", "up", "down", "left", "right", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi (e.g., IEEE Std. 802.11 a/b/g/n/v/as), Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, Zigbee, Near field communication (NFC)/RFID, CDPD, satellite systems such as GPS and GLONASS, and millimeter wave or microwave systems.

Overview

In one exemplary aspect, a smart meter is disclosed. In one embodiment, the smart meter includes a utility meter housing configured to house a smart metering module, the utility meter housing enclosing: a wireless reporting portion comprising a helical coil radiator, the helical coil radiator being coupled to an RF transmission path, the RF transmission path configured to couple the helical coil radiator to an RF transceiver integrated circuit; an enclosure configured to house the RF transceiver integrated circuit, the enclosure further comprising a distribution portion comprising one or more meter sensing electronics, the distribution portion configured to be galvanically separated from the wireless reporting portion; and a utility line port, the utility line port configured to position a utility line adjacent and parallel with the helical coil radiator; and a utility line, at least a portion of the utility line configured to be disposed within the utility meter housing at the utility line port.

Antenna subassemblies, smart metering modules as well as various methods of manufacture and use are also disclosed.

Exemplary Embodiments

Detailed descriptions of the various embodiments and variants of the apparatus and methods of the present disclosure are now provided. While primarily discussed in the context of an antenna module incorporated into a smart metering module, it is appreciated that the principles described herein may be applied to other non-smart metering module applications. For example, the principles described herein may be applied to any wireless module in which an extant utility line (or other existing conductive structure) is present in close proximity to the antenna module.

Moreover, while primarily discussed in the context of a wireless smart metering module that operates in the 169 MHz ISM band, it is appreciated that the principles described herein may be readily applied to other frequency bands. For example, the principals described herein are suitable for any antenna module having an operating frequency $\lambda$, where the size of the antenna module fits inside a sphere with the radius of this sphere being less than $\lambda/2\pi$. In other words, the use of conductive structures (e.g., extant or otherwise) may benefit the operation of these otherwise electrically small antenna modules.

Smart Metering Module—

Figure 1:
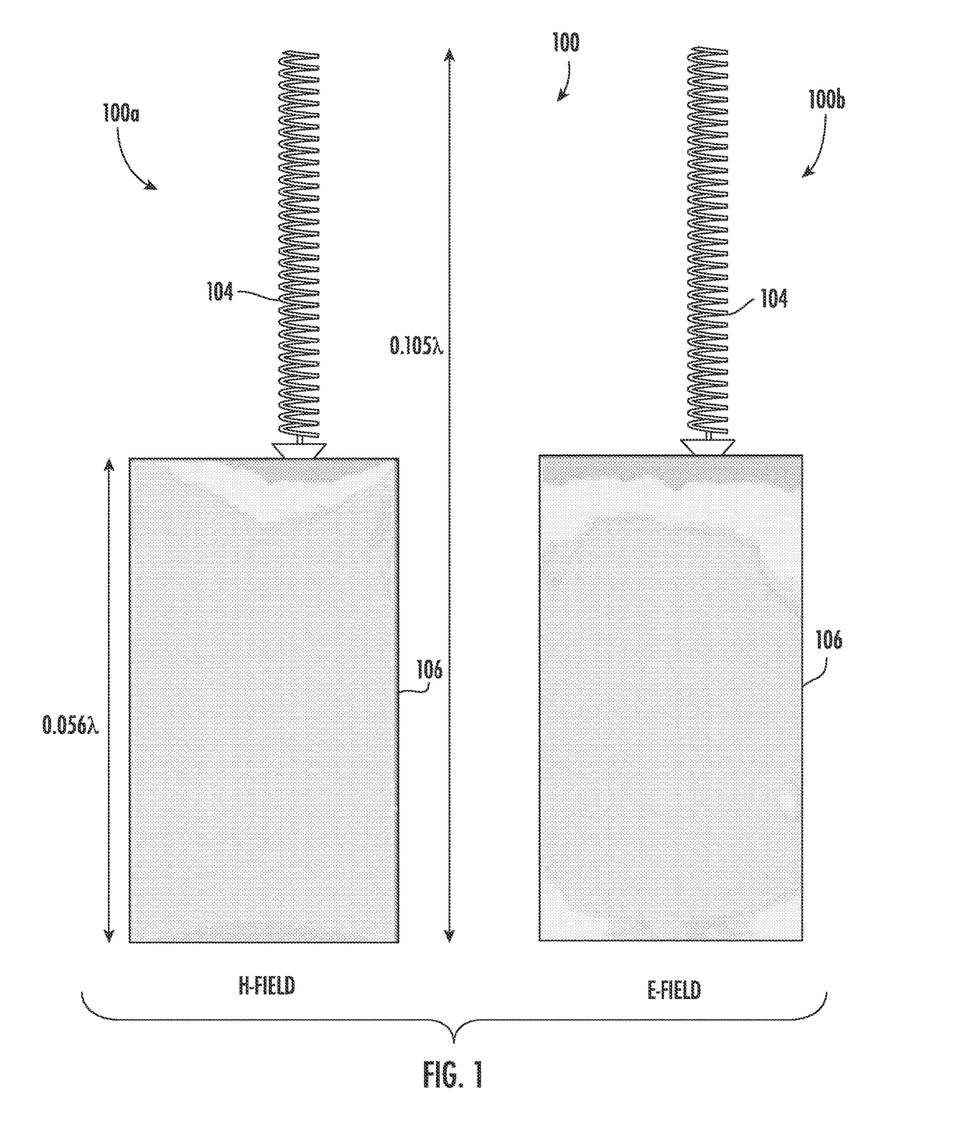
FIG. 1 is a pair of front plan views of one embodiment of a smart metering module with an electrically small antenna, illustrating native H-field and E-field distribution, respectively, in accordance with the principles of the present disclosure.

FIG. 1 illustrates an exemplary embodiment of a smart metering module 100 with an electrically small antenna and its field distributions. The smart metering module 100*a* depicted on the left side of FIG. 1 is overlaid with the magnetic field strength (H-field) shown as a function of position on the smart metering enclosure 106. The smart metering module 100*b* depicted on the right side of FIG. 1 is overlaid with the electric field strength (E-field) shown as a function of position on the smart metering enclosure 106. The respective H-field and E-field shown is represented at a time when the smart metering module is actively communicating (via transmission and in some instances reception) with, for example, a utility communications sub-station. As a brief aside, a smart metering module is an electronic device that records consumption of services provided by a utility company. These services include, for example, the provision of electricity, natural gas, and water to, for example, a home and/or business and also may include, for example, the removal of sewage, garbage, recyclables and the like from a home and/or business. The smart metering module 100 records the consumption of these aforementioned services (via, for example, on-board memory) and provides this recorded data in intervals back towards the utility. These intervals can vary widely including the provision of recorded data at intervals of less than an hour, or alternatively may provide this recorded data on a daily, weekly, monthly or some other subset/superset of the foregoing. The data provided is utilized by the utility for the purposes of monitoring the usage of their provided services as well as for the purposes of billing these end consumers.

As shown in the illustrated embodiment, the smart metering module 100 includes an enclosure 106 that houses various electronics, storage devices (memory) and various other meter mechanics that enable the smart metering module 100 to function as intended. The depicted smart metering module 100 also includes a helical coil radiator 104. In the illustrated embodiment, the helical coil radiator 104 is configured to be galvanically joined with a support printed circuit board (PCB) or substrate such as the support PCB 302 illustrated in FIG. 3. The helical coil radiator 104 will have, in the illustrated embodiment, a total height of approximately 0.09 meters and a total helical length of approximately 0.89 meters. In other words, in the illustrated helical coil radiator, the total helical length of the wire that makes up this radiator will have a wavelength of approximately $0.5\lambda$ when operating in the 169 MHz frequency band. It will be appreciated that alternative implementations may be vary the total helical length for a desired frequency band (i.e., approximately $0.5\lambda$) by, for example, varying in total height, varying in helical radius and/or varying in helical angle so long as the total helical length is approximately $0.5\lambda$. The use of the term 'approximately' in this context is due to the vagaries of antenna design. This is resultant from the fact that the actual resonant length inside the meter depends on, inter alia, the mechanics' loading effect (e.g., all conductive and dielectric parts within the antenna reactive near field) which is in many instances (but not all) difficult to estimate. Accordingly, the actual physical length of the wire in, for example, the helical coil radiator 104 may be adjusted to be less than (or more than) $0.5\lambda$ so as to tune the smart metering module 100 to a desired resonant frequency (operating band). In one or more implementations, the helical coil radiator 104 may be manufactured from a helical coil of wire.

In some implementations, the helical coil radiator 104 may be manufactured by forming helical coils using a printing process such as those disclosed in U.S. patent application Ser. No. 13/782,993 filed Mar. 1, 2013 and entitled "Deposition Antenna Apparatus and Methods"; U.S. patent application Ser. No. 14/620,108 filed Feb. 11, 2015 and entitled "Methods and Apparatus for Conductive Element Deposition and Formation"; and U.S. patent application Ser. No. 14/736,040 filed Jun. 10, 2015 and entitled "Methods and Apparatus for Conductive Element Deposition and Formation". In some implementations, the helical coil radiator 104 may be manufactured by forming helical metallic traces on the surface of a PCB or substrate via known selective etching techniques.

Figure 3:
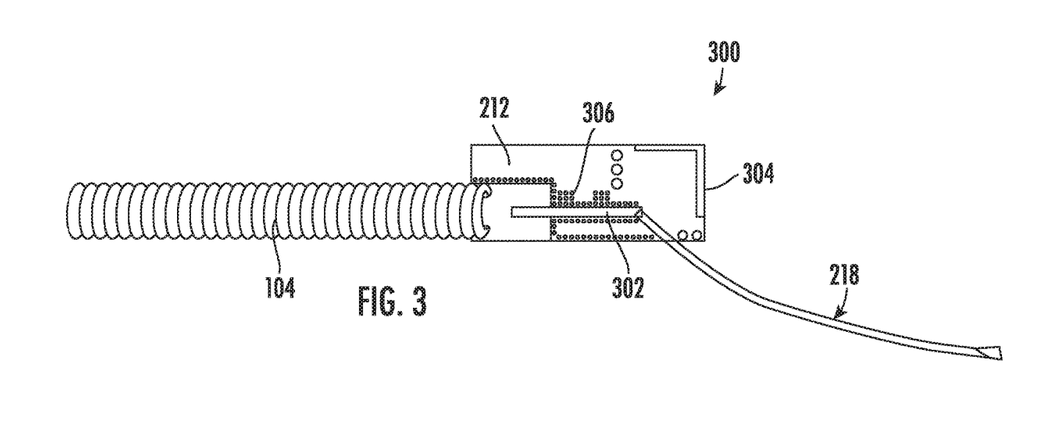
FIG. 3 is a perspective view of the antenna subassembly illustrated in FIG. 2C, in accordance with the principles of the present disclosure.

The helical coil radiator may be supported with, for example, heat shrink tubing such as the heat shrink tubing depicted over helical coil radiator 104 illustrated in FIG. 3. In one or more implementations, this covering may be utilized to protect the helical coil radiator from abrasion, user handling, the environment (e.g., moisture) and the like. In one or more implementations, the helical coil radiator 104 is wrapped with heat shrink tubing made from, for example, a thermoplastic (e.g., polyolefin, fluoropolymer(s), polyvinyl chloride (PVC), neoprene, silicone elastomer, and the like) which shrinks radially when heated. It should also be noted that heat shrink tubing typically does not shrink longitudinally when heated so as to more properly fit around the item to be wrapped. The heat shrink tubing is further configured to shrink to between one-half and one-sixth of its original size in the radial dimension. In some implementations, other types of insulating materials may be used in addition to, or alternatively from, the aforementioned heat shrink tubing. For example, in some implementations, an insulating material may be sprayed on to the helical coil radiator 104; the helical coil radiator 104 may be dipped into an insulating material, or otherwise may be applied to the helical coil radiator 104 using other conventional means. In yet other implementations, the helical coil radiator 104 may be utilized without any protective insulating coatings.

In the intended operating frequency of 169 MHz, the communicated signal will have a wavelength ($\lambda$) of approximately 1.775 meters. Accordingly, the smart metering enclosure in the embodiment of FIG. 1 has a height of $0.056\lambda$ or approximately 0.1 meters, with the helical coil radiator having a height of $0.049\lambda$ or approximately 0.09 meters resulting in a total height of $0.105\lambda$ or approximately 0.19 meters. These dimensions are merely exemplary and may be modified or adjusted in alternative implementations. For example, these dimensions are merely illustrated to point out, inter alia, the relative small size of the smart metering module (and helical coil radiator 104) as a function of its operating frequency.

Smart Metering Module with Utility Line—

Figure 2A:
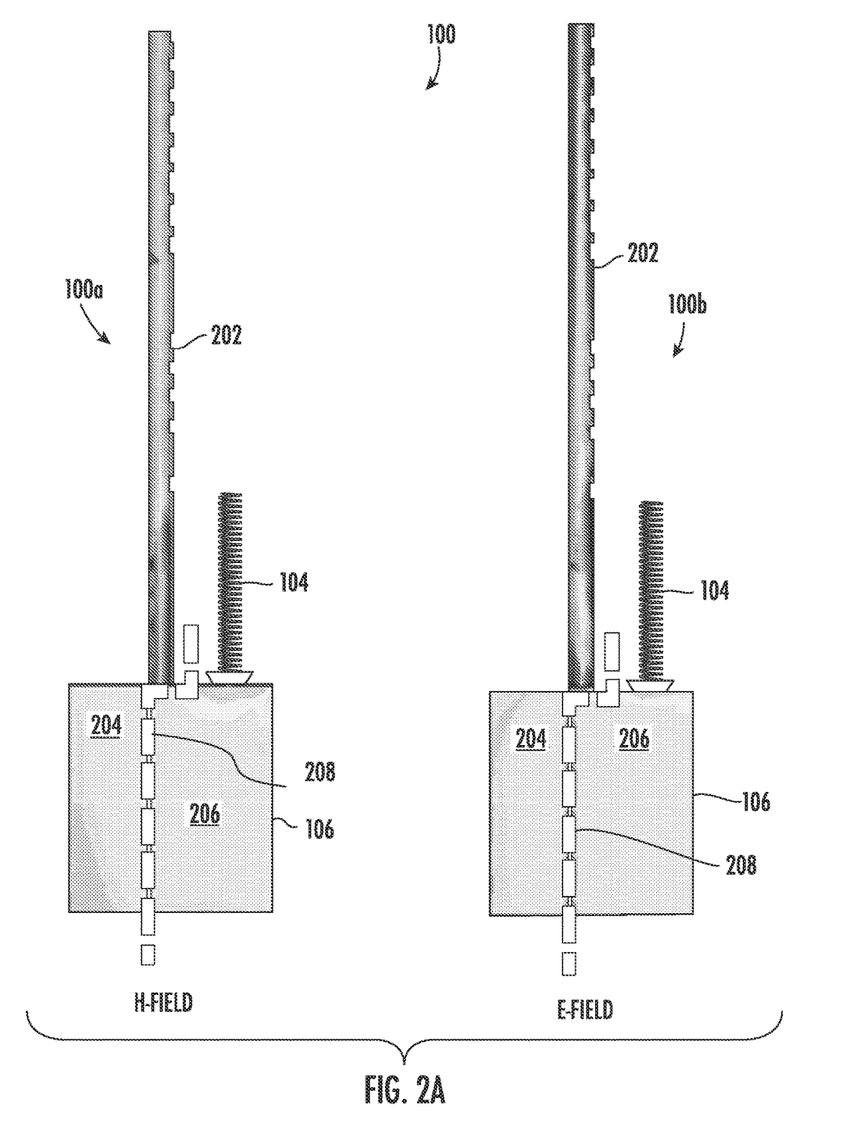
FIG. 2A is a pair of front plan views of the smart metering module with an electrically small antenna of FIG. 1 that utilizes an extant utility line, illustrating H-field and E-field distribution, respectively, in accordance with the principles of the present disclosure.

Referring now to FIG. 2A, an exemplary embodiment of a smart metering module 100 with an electrically small antenna, along with its respective field distributions are shown. The smart metering module 100*a* depicted on the left side of FIG. 2A is overlaid with the magnetic field strength (H-field) shown as a function of position on the smart metering enclosure 106. The smart metering module 100*b* depicted on the right side of FIG. 2A is overlaid with the electric field strength (E-field) shown as a function of position on the smart metering enclosure 106. The embodiment shown in FIG. 2A differs from that shown in FIG. 1 in that an extant utility line 202 is also included. In an exemplary embodiment, this extant utility line will be constructed from a conductive material (e.g., copper pipe or copper wire) and may include one or more of a power line (e.g., an electrical cable), a gas line (e.g., a natural gas line), a water or sewage line and the like, depending on the particular type of metering to be performed by the smart metering module 100. The use of the word 'extant' refers to the fact that this utility line may be already resident at the home, business, or other location where the smart metering module 100 is to be installed. In some implementations, this utility line may include an item that is newly installed with the installation of the smart metering module. In yet other implementations, this utility line may be provided with the smart metering module 100 (i.e., as a combined module) prior to installation at the home, business, or other location.

This utility line 202 generally runs adjacent to the helical coil radiator 104 and in a generally parallel fashion with a longitudinal axis of the adjacently disposed helical coil radiator 104. For example, in some implementations utility line 202 may be separated from the helical coil radiator 104 by a distance measure 'X', where 'X' is less than or equal to $0.62*\text{sqrt}(r^3/\lambda)$, where 'r' is the radius of a sphere in which the antenna module of the wireless reporting portion 206 fits. Additionally, the utility line 202 will run a length of at least 0.5 times the operating wavelength ($\lambda$) of the helical coil radiator 104.

As illustrated in FIG. 2A, the wireless reporting portion 206 of the smart metering module 100 may be galvanically separated 208 from the distribution portion 204 of the smart metering module 100. This galvanic separation enables electrical isolation between the two portions of the smart metering module 100. In other words, this galvanic separation enables the electronics associated with the distribution portion 204 of the smart metering module (e.g., the utility consumption measuring electronics, storage, and the like) to be separated from the wireless reporting portion 206 electronics as will be described with reference to FIGS. 2C and 3. In one or more implementations, this galvanic separation 208 is achieved by using separate PCBs or substrates between the wireless reporting portion 206 and the distribution portion 204 of the smart metering module 100. In some implementations, this galvanic separation 208 may be enhanced via the inclusion of electromagnetic interference (EMI) shielding (not shown) disposed between the wireless reporting portion 206 and the distribution portion 204.

Figure 2B:
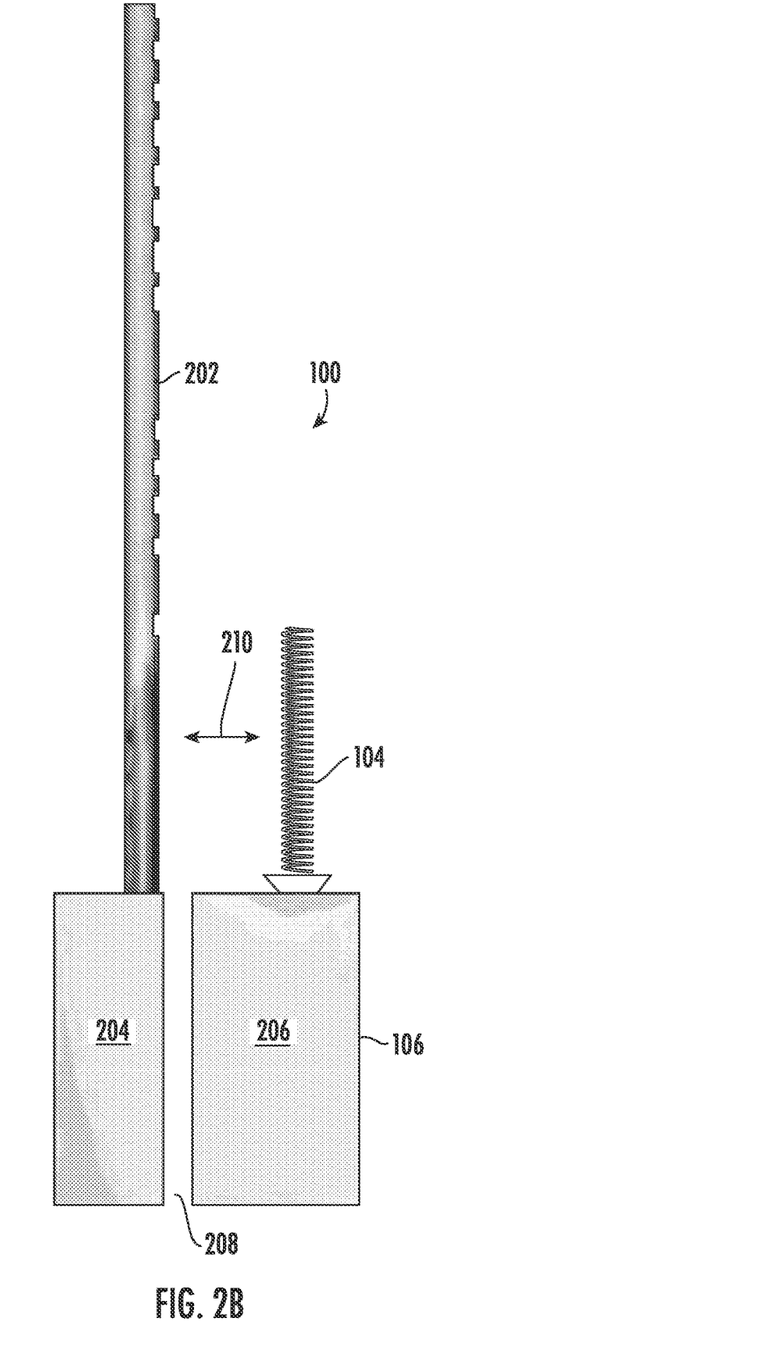
FIG. 2B is a front plan view of the smart metering module of FIG. 2A, illustrating the galvanically decoupled nature of components of the smart metering module, in accordance with the principles of the present disclosure.

Referring now to FIG. 2B, the electromagnetic field coupling 210 between the helical coil radiator element 104 and the utility line 202 is illustrated. Specifically, the H-field coupling distribution on the utility line is shown in additional detail as previously depicted in smart metering module 100a of FIG. 2A. Additionally, the galvanic separation 208 between the distribution portion 204 and the wireless reporting portion 206 is illustrated as being physically discrete portions. However, it is appreciated that this galvanic separation 208 (i.e., no common ground contact between the distribution portion 204 electronics and the wireless reporting 206 electronics) may actually be effectuated regardless of whether or not the distribution portion 204 and the wireless reporting portion 206 are actually part of a single (common) enclosure 106.

Figure 2C:
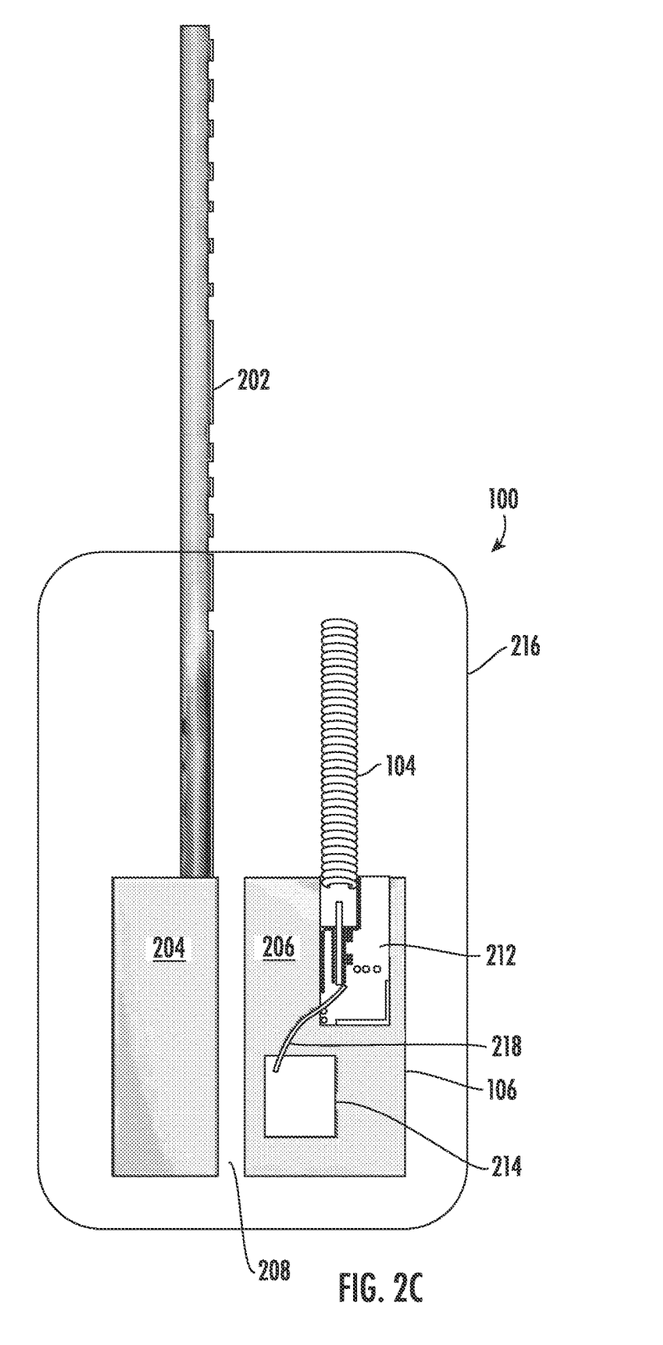
FIG. 2C is a front plan view of the smart metering module of FIG. 2A shown disposed within an exemplary smart meter, in accordance with the principles of the present disclosure.

FIG. 2C illustrates the smart metering module 100 with utility line 202, disposed within a utility meter housing 216. This utility meter housing 216 may include an extant housing disposed at the home, business, or other physical location. In other implementations, this utility meter housing 216 may be installed with the smart metering module 100 prior to its installation at the home, business, or other physical location. As previously discussed, the distribution portion 204 includes various electronic sensing electronics, mechanical measuring electronics and/or storage (memory). The wireless reporting portion 206 may include the antenna subassembly that includes the helical coil radiator 104. The antenna subassembly may include a PCB and/or substrate 212 that is coupled to a radio frequency (RF) transceiver integrated circuit 214 via an RF feed 218. In some implementations, the RF transceiver integrated circuit 214 may be resident on the same PCB or substrate 212 that makes up the antenna subassembly. In other implementations, the RF transceiver integrated circuit 214 will reside on a PCB or substrate that is separate and distinct from the antenna subassembly PCB or substrate.

Smart Metering Module Antenna Subassembly—

Referring now to FIG. 3, one exemplary antenna subassembly 300 for use with a smart metering module such as that shown with regards to FIGS. 1-2C is illustrated. As illustrated the antenna subassembly 300 may include a helical coil radiator 104 with heat shrink tubing disposed thereon. The helical coil radiator 104 may be galvanically coupled with the antenna subassembly PCB or substrate 212. The transmission path from the RF feed 218 to the helical coil radiator 104 may include impedance matching circuitry 306. This impedance matching circuitry 306 may be utilized to match the impedance of the helical coil radiator 104 with the transmission line 302 and RF feed 218. In the illustrated embodiment, the RF feed 218 includes a coaxial feed to the RF transceiver integrated circuit (214, FIG. 2C). In one or more implementations where the RF transceiver integrated circuit resides on the same PCB or substrate 212 as the helical coil radiator, the coaxial feed may be obviated via use of a transmission line on the PCB or substrate 212 that couples the helical coil radiator 104 with the radio input and/or output of the RF transceiver integrated circuit. In one or more implementations where the RF transceiver integrated circuit resides on a distinct PCB or substrate from the antenna subassembly PCB or substrate 212, the PCB or substrate 212 may include a contact point 304 to the RF transceiver integrated circuit ground plane. In some implementations, this contact point 304 may be coupled to the RF transceiver ground plane via direct soldering. In some implementations, this contact point 304 may be coupled to the RF transceiver ground plane via a spring loaded clip (e.g., a pogo pin, a conductive clip and/or other mechanical couplings). In some implementations, the contact point 304 may be electromagnetically coupled to the RF transceiver ground plane. These and other variations would be readily apparent to one of ordinary skill given the contents of the present disclosure.

Smart Meter Module Performance—

Figure 4:
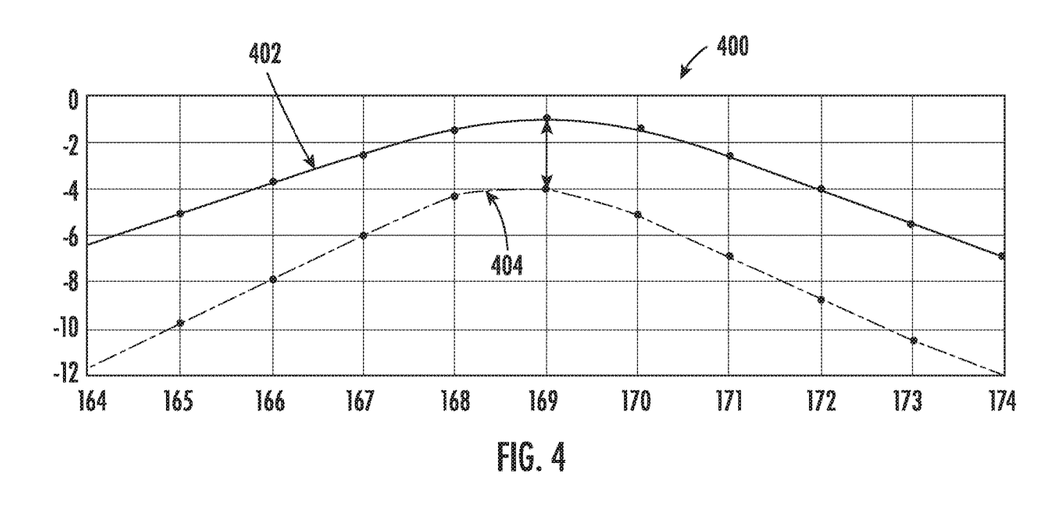
FIG. 4 is a plot of antenna efficiency as a function of frequency illustrating the performance differences between the antenna module illustrated in FIG. 1 and the antenna module illustrated in FIGS. 2A-3, in accordance with the principles of the present disclosure.

Referring now to FIG. 4, an exemplary plot 400 illustrating the radiation efficiency curve 402 as a function of frequency for the smart meter module depicted in FIGS. 2A-2C as compared with the radiation efficiency curve 404 of a smart meter module without a utility line as a function of frequency. As described elsewhere herein, the antenna dimensions of the smart meter module depicted herein are substantially smaller than the operating wavelength of the helical coil radiator. By utilizing the utility line, the radiation efficiency for the smart metering module increases by approximately 3 dB (i.e., from approximately −4 dB to approximately −1 dB). In other words, by utilizing the utility line, the total antenna efficiency for the smart metering module improves substantially as a result of the fact that this utility line increases the apparent size of the smart metering antenna module. As can be seen in the example illustrated in FIG. 4, the frequency range depicted varies from 164 MHz to 174 MHz with the center frequency arranged around 169

MHz. Moreover, the total antenna radiation efficiency scale (vertical scale) ranges from 0 dB to −12 dB. As discussed elsewhere herein, the use of the 169 MHz center frequency is merely exemplary. The principles described herein may be readily applied to other operating frequencies where the physical size of the radiator and antenna module structure is small as compared with the wavelength of the operating frequency.

It will be recognized that while certain aspects of the present disclosure are described in terms of specific design examples, these descriptions are only illustrative of the broader methods of the disclosure, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A smart metering module, comprising:
   a wireless reporting portion comprising a helical coil radiator, the helical coil radiator being coupled to an RF transmission path, the RF transmission path configured to couple the helical coil radiator to an RF transceiver integrated circuit;
   an enclosure configured to house the RF transceiver integrated circuit, the enclosure further comprising a distribution portion comprising one or more meter sensing electronics, the distribution portion configured to be galvanically separated from the wireless reporting portion; and
   a utility line port, the utility line port configured to position a utility line adjacent and parallel with a longitudinal axis of the helical coil radiator, the adjacent and parallel position being configured to electromagnetically couple the utility line with the helical coil radiator in order to increase a radiation efficiency for the helical coil radiator as compared with another helical coil radiator of another smart metering module without an adjacent and parallel utility line.

2. The smart metering module of claim 1, wherein an operating wavelength for the wireless reporting portion is equal to a distance unit of $\lambda$, where a size of the wireless reporting portion fits within a sphere having a radius 'r' that is less than or equal to a distance unit of $\lambda/2\pi$.

3. The smart metering module of claim 2, wherein the utility line port is configured to position the utility line a distance that is less than or equal to a distance unit of $0.62*\text{sqrt}(r^3/\lambda)$.

4. The smart metering module of claim 1, wherein the utility line port is configured to position the utility line a distance that is less than or equal to $0.62*\text{sqrt}(r^3/\lambda)$, where 'r' is a radius of a sphere in which the wireless portion fits and where an operating wavelength for the wireless reporting portion is equal to a distance unit of $\lambda$.

5. The smart metering module of claim 4, wherein a length of the helical coil radiator is equal to approximately a distance unit of $0.5\ \lambda$.

6. The smart metering module of claim 5, wherein the helical coil radiator comprises a conductive layer that is printed onto a dielectric substrate.

7. A smart meter, comprising:
   a utility meter housing configured to house a smart metering module, the utility meter housing enclosing:
      a wireless reporting portion comprising a helical coil radiator, the helical coil radiator being coupled to an RF transmission path, the RF transmission path configured to couple the helical coil radiator to an RF transceiver integrated circuit;
      an enclosure configured to house the RF transceiver integrated circuit, the enclosure further comprising a distribution portion comprising one or more meter sensing electronics, the distribution portion configured to be galvanically separated from the wireless reporting portion; and
      a utility line port, the utility line port configured to position a utility line adjacent and parallel with a longitudinal axis of the helical coil radiator in order to increase a radiation efficiency for the helical coil radiator as compared with another similarly sized helical coil radiator of another smart meter without an adjacent and parallel utility line;
   wherein at least a portion of the utility line is configured to be disposed within the utility meter housing at the utility line port.

8. The smart meter of claim 7, wherein an operating wavelength for the wireless reporting portion is equal to a distance unit of $\lambda$, where a size of the wireless reporting portion fits within a sphere having a radius 'r' that is less than or equal to a distance unit of $\lambda/2\pi$.

9. The smart meter of claim 8, wherein the utility line port is configured to position the utility line a distance that is less than or equal to a distance unit of $0.62*\text{sqrt}(r^3/\lambda)$.

10. The smart meter of claim 7, wherein the utility line port is configured to position the utility line a distance that is less than or equal to a distance unit of $0.62*\text{sqrt}(r^3/\lambda)$, where 'r' is a radius of a sphere in which the wireless reporting portion fits and where an operating frequency wavelength for the wireless reporting portion is equal to a distance unit of $\lambda$.

11. The smart meter of claim 7, wherein the utility line is selected from a group consisting of a power line, a gas line, and a water or sewage line.

12. The smart meter of claim 11, wherein the utility line port is configured to position the utility line a distance having a distance unit that is less than or equal to $0.62*\text{sqrt}(r^3/\lambda)$, where 'r' is a radius of a sphere in which the wireless reporting portion fits and where an operating wavelength for the wireless reporting portion is equal to a distance unit of $\lambda$.

13. The smart meter of claim 11, wherein a length of the utility line that runs parallel with the helical coil radiator is at least a distance unit of $0.5\lambda$, where $\lambda$ is an operating wavelength for the wireless reporting portion.

* * * * *